(12) United States Patent
Marbach (10) Patent No.: US 11,975,331 B2
(45) Date of Patent: May 7, 2024

(54) SAMPLE CONTAINERS FOR USE INSIDE INTEGRATING CAVITIES, AND TOOLS (71) Applicant: GrainSense Oy, Oulu (FI)

(72) Inventor: Ralf Marbach, Oulu (FI)

(73) Assignee: GrainSense Oy, Oulu (FI)

( * ) Notice: Subject to any disclaimer, the term of this patent is extended or adjusted under 35 U.S.C. 154(b) by 867 days.

(21) Appl. No.: 16/980,483

(22) PCT Filed: Jan. 29, 2019

(86) PCT No.: PCT/FI2019/050064
§ 371 (c)(1),
(2) Date: Sep. 14, 2020

(87) PCT Pub. No.: WO2019/175468
PCT Pub. Date: Sep. 19, 2019

(65) Prior Publication Data
US 2021/0023566 A1  Jan. 28, 2021

(30) Foreign Application Priority Data

Mar. 14, 2018 (FI) ..................... 20185243

(51) Int. Cl.
*B01L 9/00* (2006.01)
*B01L 3/00* (2006.01)
(Continued)

(52) U.S. Cl.
CPC .............. *B01L 9/523* (2013.01); *B01L 3/502* (2013.01); *B01L 3/50853* (2013.01); *G01N 1/04* (2013.01);
(Continued)

(58) Field of Classification Search
CPC ...... B01L 9/523; B01L 3/502; B01L 3/50853; B01L 2300/042; B01L 2300/06;
(Continued)

(56) References Cited

U.S. PATENT DOCUMENTS 3,755,042 A  8/1973 Robertson et al.
5,059,024 A * 10/1991 Esquivel ................ G01N 21/03
356/402

(Continued)

FOREIGN PATENT DOCUMENTS

CN  101294847 A  10/2008
CN  106170692 A  11/2016
(Continued)

OTHER PUBLICATIONS

Hoon, Stephen R; The Design and Developement of a Closed Chamber for the in-situ Quanification of Dryland Sail Carbon Dioxide Fluxes; Geographical Research; 47, pp. 71-82. (Year: 2009).*

(Continued)

*Primary Examiner* — Michael A Lyons
(74) *Attorney, Agent, or Firm* — Laine IP Oy (57) ABSTRACT According to an example aspect of the present invention, there is provided a sample container for use inside an optically integrating cavity, comprising an enclosing member comprised of fluorocarbon plastic, the enclosing member having diffuse transmittance of at least 80% and the sample container being adapted to contain a solid or liquid sample.

15 Claims, 4 Drawing Sheets (51) Int. Cl.
*G01N 1/04* (2006.01)
*G01N 1/14* (2006.01)
*G01N 21/01* (2006.01)
*G01N 21/25* (2006.01)

(52) U.S. Cl.
CPC .............. *G01N 1/14* (2013.01); *G01N 21/01* (2013.01); *G01N 21/255* (2013.01); *B01L 2300/042* (2013.01); *B01L 2300/0609* (2013.01); *B01L 2300/0654* (2013.01); *B01L 2300/12* (2013.01); *B01L 2300/168* (2013.01); *G01N 2201/065* (2013.01)

(58) Field of Classification Search
CPC ......... B01L 2300/0654; B01L 2300/12; B01L 2300/168; B01L 3/508; G01N 1/04; G01N 1/14; G01N 21/01; G01N 21/255; G01N 2201/065; G01N 2021/0339; G01N 2201/0632; G01N 21/03
See application file for complete search history.

(56) References Cited

U.S. PATENT DOCUMENTS

| | | | |
|---|---|---|---|
| 5,171,995 | A | 12/1992 | Gast et al. |
| 5,524,133 | A | 6/1996 | Neale et al. |
| 6,103,169 | A | 8/2000 | Mathus et al. |
| 6,413,786 | B1 | 7/2002 | Hansen et al. |
| 2003/0120137 | A1 | 6/2003 | Pawluczyk |
| 2004/0169857 | A1* | 9/2004 | Acosta ................. G01N 21/278 356/243.4 |
| 2012/0063925 | A1 | 3/2012 | Parker |
| 2012/0063952 | A1 | 3/2012 | Hong et al. |
| 2012/0288421 | A1 | 11/2012 | Horiuchi et al. |
| 2015/0260648 | A1 | 9/2015 | Xu |
| 2015/0355083 | A1 | 12/2015 | Marbach |
| 2015/0355087 | A1* | 12/2015 | Moggridge ........ G01N 21/4738 362/296.05 |
| 2016/0299062 | A1 | 10/2016 | Marbach |
| 2017/0315052 | A1* | 11/2017 | Dasgupta ............... G01N 21/33 |

FOREIGN PATENT DOCUMENTS

| | | | | |
|---|---|---|---|---|
| DE | 69226771 | T2 | 4/1999 | |
| EP | 1855879 | B1 | 11/2007 | |
| EP | 2315003 | A1 | 4/2011 | |
| EP | 2315004 | A1 | 4/2011 | |
| EP | 2647981 | A1 | 10/2013 | |
| GB | 2371629 | A | 7/2002 | |
| JP | 3068133 | U | 4/2000 | |
| JP | 3211912 | * | 8/2017 | ............. G01N 23/22 |
| JP | 2018017580 | A | 2/2018 | |
| RU | 2051383 | C1 | 12/1995 | |
| RU | 2497100 | C2 | 10/2013 | |
| RU | 154433 | U1 | 8/2015 | |
| WO | WO2008001737 | A1 | 1/2008 | |
| WO | WO-2009000069 | A1 * | 12/2008 | ......... G01N 21/0303 |

OTHER PUBLICATIONS

CHEMOURS: Teflon FEP Fluoropolymer film. Information Bulletin, 2017. XP055567503. URL: https://www.chemours.com/TeflonIndustrial/enUS/assets/downloads/teflon-fep-film-technTcal-information.pdf.

Introduction Diffuse Reflecting Materials: Datasheet (online). SphereOptics 2017. Retrived on Oct. 8, 2018. https://sphereoptics.de/en/product/introduction-diffuse-reflecting-materials/>.

* cited by examiner

SAMPLE CONTAINERS FOR USE INSIDE INTEGRATING CAVITIES, AND TOOLS

FIELD

The present invention relates to tools for storing and preparing samples for spectroscopic procedures.

BACKGROUND

Spectroscopic measurements are used to determine a composition of a sample. Chemical substances have characteristic emission and absorption frequencies, which correspond to lines or bands in a spectrum. The characteristic frequencies may be used to determine which chemical substances are present in a sample. A sample may be investigated in a laboratory setting, although the same principle is equally usable in determining the composition, for example, of an interstellar gas cloud by determining which lines of starlight passing through such a cloud have been absorbed by molecules of the cloud.

Determining the chemical composition of a sample may thus comprise obtaining a spectrum of the sample, and then determining the spectral characteristics of the spectrum, for example by comparing emission and/or absorption lines in the spectrum to reference literature, which described spectral characteristics of known chemical substances, which have been measured in laboratories in advance. Determining the chemical composition is more challenging in case the sample comprises many different chemical components, where the chemical components are complex molecules and/or where the spectrum is from a target that is difficult to measure reproducibly in practice.

Where agricultural samples, such as grain, for example, are analysed, the aim of the analysis may be to determine the moisture and/or protein content of the sample, for example. Such information may be usable in agricultural decision making and planning.

An integrating sphere, or more broadly integrating cavity, is an optical tool comprising a cavity with the interior walls covered with a diffusive white coating. The diffusive white coating transforms light guided into the cavity, by multiple scattering reflections, into a homogenous photon gas which fills the cavity, the directionality of the originally incident light being lost. The light in the cavity is homogenous and isotropic in nature.

SUMMARY OF THE INVENTION

According to some aspects, there is provided the subject-matter of the independent claims. Some embodiments are defined in the dependent claims.

According to a first aspect of the present invention, there is provided a sample container for use inside an optically integrating cavity, comprising an enclosing member comprised of fluorocarbon plastic, the enclosing member having diffuse transmittance of at least 80% and the sample container being adapted to contain a solid or liquid sample.

Various embodiments of the first aspect may comprise at least one feature from the following bulleted list:
- the enclosing member has an even edge, enabling scraping off an excess amount of powder
- the sample container comprises a lid, attachable to the sample container, to close the sample container
- the enclosing member defines an inner dimension of the sample container, the inner dimension being more than 3 millimetres
- the sample container has plural tubes of inner dimension more than 3 millimetres
- the sample container comprises a pumping mechanism for drawing liquid into the sample container
- the enclosing member is comprised of fluorocarbon plastic by at least 98% of its volume
- the sample container has a scattering member with diffuse transmittance less than 20%
- the sample container comprises at least one of the following: a tube, a shovel and a flat pan
- the sample container has an inner volume in the range of 0.5 to 20 cubic centimetres
- the sample container has dimples or pits for containing, separately, plural sample elements of the sample
- the sample container has a circular concave shape known as a watch glass.

According to a second aspect of the present invention, there is provided a spectroscopic sample preparation tool, comprising at least one of a cutting edge of fluorocarbon plastic, gripping surfaces of fluorocarbon plastic, and a probe end of fluorocarbon plastic.

According to a third aspect of the present invention, there is provided a method, comprising placing a solid or liquid sample in a sample container, the sample container comprising an enclosing member comprised of fluorocarbon plastic, the enclosing member having a diffuse transmittance of at least 80%, and performing a measurement with the sample, with the sample and the sample container placed in their entirety inside an optically integrating cavity.

Some embodiments of the third aspect further comprise modifying the solid or liquid sample using a spectroscopic sample preparation tool which comprises at least one of: a cutting edge of fluorocarbon plastic, gripping surfaces of fluorocarbon plastic, and a probe end of fluorocarbon plastic.

EMBODIMENTS

Sample handling tools, such as sample containers and sample preparation tools, are herein described such that these tools are comprised of, or coated with, a material which comprises little or no hydrogen. This provides, as will be laid out herein below, benefits with regard to using an integrating cavity where the sample is placed inside the cavity for analysis.

Figure 1:
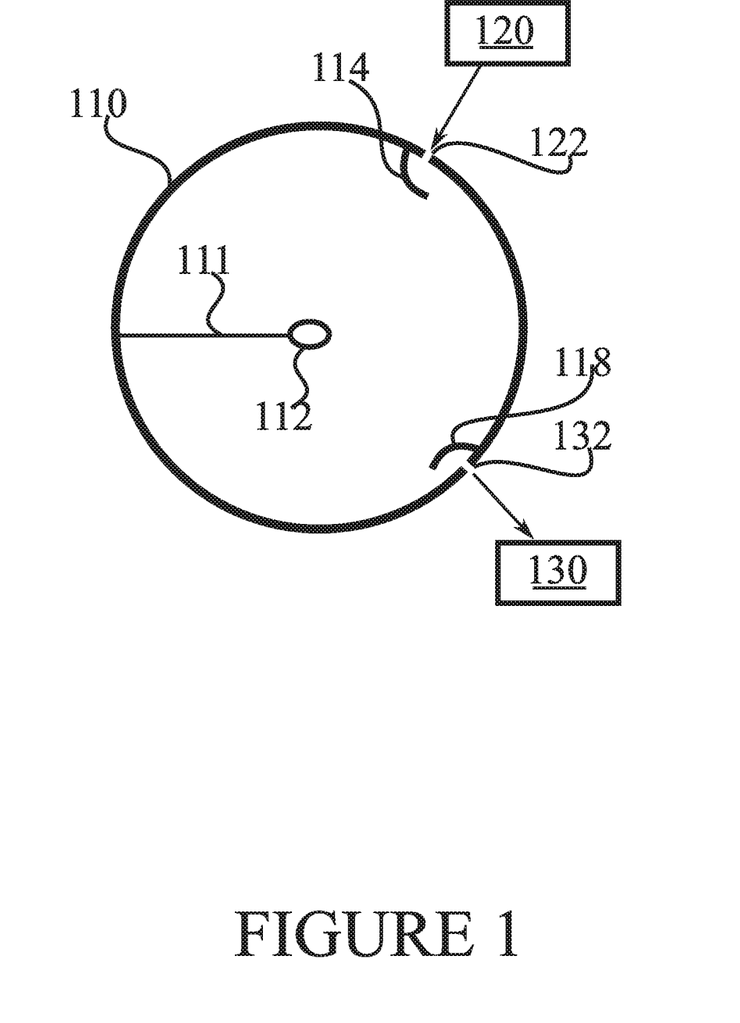
FIG. 1 illustrates an example system in accordance with at least some embodiments of the present invention.

FIG. 1 illustrates an example system in accordance with at least some embodiments of the present invention. The system comprises an integrating cavity 110, which may have the shape of a sphere, ovoid or another suitable shape. In case the cavity is a sphere, it may be referred to as an Ulbricht sphere. A spherical shape is most effective in homogenizing radiation therein. The interior wall of cavity 110 is coated with a suitable diffusive coating, such as Spectralon™, magnesium oxide, barium sulphate or indeed another suitable material, depending on which wavelengths are to be investigated. For example, the diffusive coating may have nearly 100% diffusive reflectance. Fluorescent materials may be avoided, since they emit radiation with longer wavelengths than they absorb, which would impair the functioning of the integrating cavity by changing the spectrum of light in cavity 110.

Electromagnetic radiation is introduced into the cavity from source 120, via port 122. Source 120 may be selected in dependence of the wavelengths where the spectral features of the sample to be analysed are expected to be found. Source 120 may be configured to produce light in a continuous frequency range. Source 120 need not have a flat spectrum, since the integrating cavity may be measured first without a sample therein, to enable taking into account, in an analysis of the results, the optical characteristics of the integrating cavity and the spectral characteristics of source 120. As such, an incandescent source, producing black-body radiation, may be used, for example.

Baffle 114, which may be coated with the diffusive coating, may be used to initiate the multiple internal scatterings of incident light and prevent direct illumination of the sample from the input port 122. The radiation may be in the visible part of the light spectrum, in the infrared or ultra-violet, depending on the wavelengths of spectral characteristics that are to be investigated in cavity 110.

Sample container 112 is arranged inside cavity 110. By being inside it is herein meant that the diffuse coating of the interior wall of cavity 110 surrounds sample container 112 on all sides and sample container 112 is not built or installed as part of the wall of cavity 112, for example. Sample container 112 may be suspended in cavity 110, for example by a translucent member 111 attached to the wall of cavity 110. The translucent member may be of the same material as sample container 112, for example. In some embodiments, sample container is made of a first fluorocarbon material and translucent member 111 is made of a second fluorocarbon material. In some embodiments, member 111 may be nontranslucent, that is, the translucency of member 111 is not a mandatory element of the invention. When member 111 is translucent or, preferably, transparent, a benefit is obtained in that there is less material in cavity 110, other than the sample to be analysed, modifying spectral characteristics of the diffuse light of the integrating cavity. An example way of modifying spectral characteristics of the diffuse light is absorbing. In general, all materials in cavity 110, except the sample itself, may have a zero absorption coefficient. These materials may reflect or transmit but should not absorb.

When an absorbing sample is put inside an integrating cavity 110, a power density of the diffuse photon field inside the cavity decreases. This decrease can be measured with a photodetector, which can be located inside the cavity, or, more commonly, outside the cavity and "looking" at an exit port as in FIG. 1. An absorbance-like spectrum of the sample can be measured in the same way as in the case of a conventional transmission cuvette, namely, by dividing the detector intensity measured with the sample inside the cavity, $H_{sample}(\lambda)$, where $\lambda$ the optical wavelength, with the detector intensity measured with a reference object inside the cavity, $H_{ref}(\lambda)$, which usually is just the empty sphere, that is, just air inside. For example, when using the decadic logarithm, the absorbance spectrum is, $A(\lambda) = -\log_{10}(H_{sample}(\lambda)/H_{ref}(\lambda))$. The method of measuring samples inside the integrating cavity is particularly beneficial for samples having a low absorption coefficient, as the effective absorbance path length is amplified by the multiple sample interactions of the diffuse light inside the cavity and the measurement result is virtually independent of changes in the geometry of the sample, scattering within the sample, and reflections at the surface of the sample.

Overall, benefits of placing the sample inside the cavity may be summed up as 1) amplification of the absorbance signal of the sample due to a sphere multiplier factor, 2) reduction of sample presentation errors, that is, the exact location and orientation of the sample are not important, 3) simplicity of loading samples, including granular and liquid samples, 4) high detector irradiance levels, 5) small dynamic range for the photodetector and electronics, and 6) ease of achieving a linear and reliable absorbance response from the sample.

The sample to be investigated may be placed in sample container 112, which may be fully enclosing the sample or have an open top. The sample may be arranged in sample container 112 as an optically thin sample, for example, by which it is meant the hidden mass effect is below approximately 40%. Equally, when a sample is optically thin, its mass acts as a predominantly translucent sample for the diffused light inside the integrating cavity. By hidden mass it is meant a part of the sample which does not contribute to spectral filtering in the integrating cavity. For example, a thick sample may have an internal part of the sample which is shaded from the diffuse light of the integrating cavity by a surface layer of the sample, thus preventing the internal part from interacting with the diffuse light inside the integrating cavity.

The sample may comprise, for example, whole seeds, seed slices, olive oil, beer, fruit slices, water and/or blood. Slicing a sample may provide a benefit in rendering the sample optically thin, or at least optically thinner than an unsliced sample. A thickness of a slice may be, for example, 0.2 millimetres, 0.4 millimetres or 0.8 millimetres. To obtain an optically thin slice, a thinner slice thickness may be selected for samples that are more opaque, to enable the slice to be predominantly translucent. Preparation of a sample for analysis in an integrating cavity such as cavity 110 may comprise slicing the sample, opening a sample such as a fruit, tearing a sample or otherwise processing a sample to expose more of its internal mass, so the sample is made more optically thin. In case of the so-called third overtone range of the near infrared spectrum, which ranges from about 800 to 1100 nanometres of wavelength, the absorption coefficients of most organic samples are so low that optical thinness is achieved as long as the sample is thinner than about four millimetres in at least one dimension.

Sample container 112 may be transparent to the wavelengths in use in cavity 110. In detail, sample container 112 may be constructed of a material which does not interact much with the diffuse light of the integrating cavity. At least some embodiments of the present invention use fluorocarbon plastic as a material from which sample container 112 is constructed. Fluorocarbon plastic may comprise, for example, polytetrafluoroethylene, PTFE, fluorinated ethylene propylene, FEP, perfluoroalkoxy alkane, PFA, or other fluorocarbon plastics. Pure PTFE consists wholly of carbon and fluorine.

Parts manufactured from PTFE are translucent and may have high diffuse transmittance over a large part of the technically relevant wavelength ranges covering the ultraviolet, visible, near infrared, and mid-infrared regions of the electromagnetic spectrum. This enables a PTFE-based sample container to transmit diffused light through its structure. FEP on the other hand is highly transparent as such, and PFA is highly translucent. By diffuse transmittance it is herein meant transmittance of diffuse light, in other words, light is diffuse both before being transmitted through the material and after being transmitted through the material. The near infrared wavelength range reaches from about 700 to 2500 nanometres, which is a range useful in many real-life measurements. Plastics other than fluorocarbon plastics have absorbance bands in the near infrared range, making them less attractive for use in analysing samples in integrating cavities.

Transparency, in general, is a property of allowing light to pass through a material without being scattered. Translucency is, in general, a property of allowing light to pass through, but not necessarily without scattering. In detail, a translucent material may have a diffuse transmittance. In an integrating cavity, either a transparent or, more generally, a translucent material may be seen as beneficial, since the light in the cavity is diffuse already. The signal being measured is carried in spectral characteristics, not directional aspects, of the light, wherefore a diffusely transmittive or transparent material may equally enable an interaction between the sample and the diffuse light inside cavity 110, the interaction resulting in spectral filtering of the diffuse light.

When the sample is analysed specifically inside the integrating cavity, as opposed to outside it, transparency of the sample container achieves a synergistic benefit in that for samples having a low absorption coefficient, a sphere multiplication factor of cavity 110 multiplies the absorbance of the sample. In effect, the integrating cavity, used with the sample in the cavity, amplifies a weak absorbance signal of the sample. The cavity would likewise multiply any absorbance of the sample container itself, wherefore a non-absorbing, that is, translucent or more preferably transparent, sample container enables obtaining a maximum benefit from placing the sample inside the integrating cavity.

The diffuse light in the cavity interacts with the sample, which converts the diffuse light into spectrally filtered light. The spectrally filtered light is allowed to leak from the cavity through exit port 132, which may be shielded by baffle 118. Like baffle 114, baffle 118 may be coated with a diffuse white coating. Baffle 118 may be present or absent independently of baffle 114. A spectral analyser 130 is configured to determine spectral characteristics of the spectrally filtered light, such as, for example, energy density as a function of wavelength. A fibre optic connection may convey the leaked light from exit port 132 to spectral analyser 130, for example. Lenses and mirrors and other optical components known to the art may be used to guide light to and from the ports.

Figure 2:
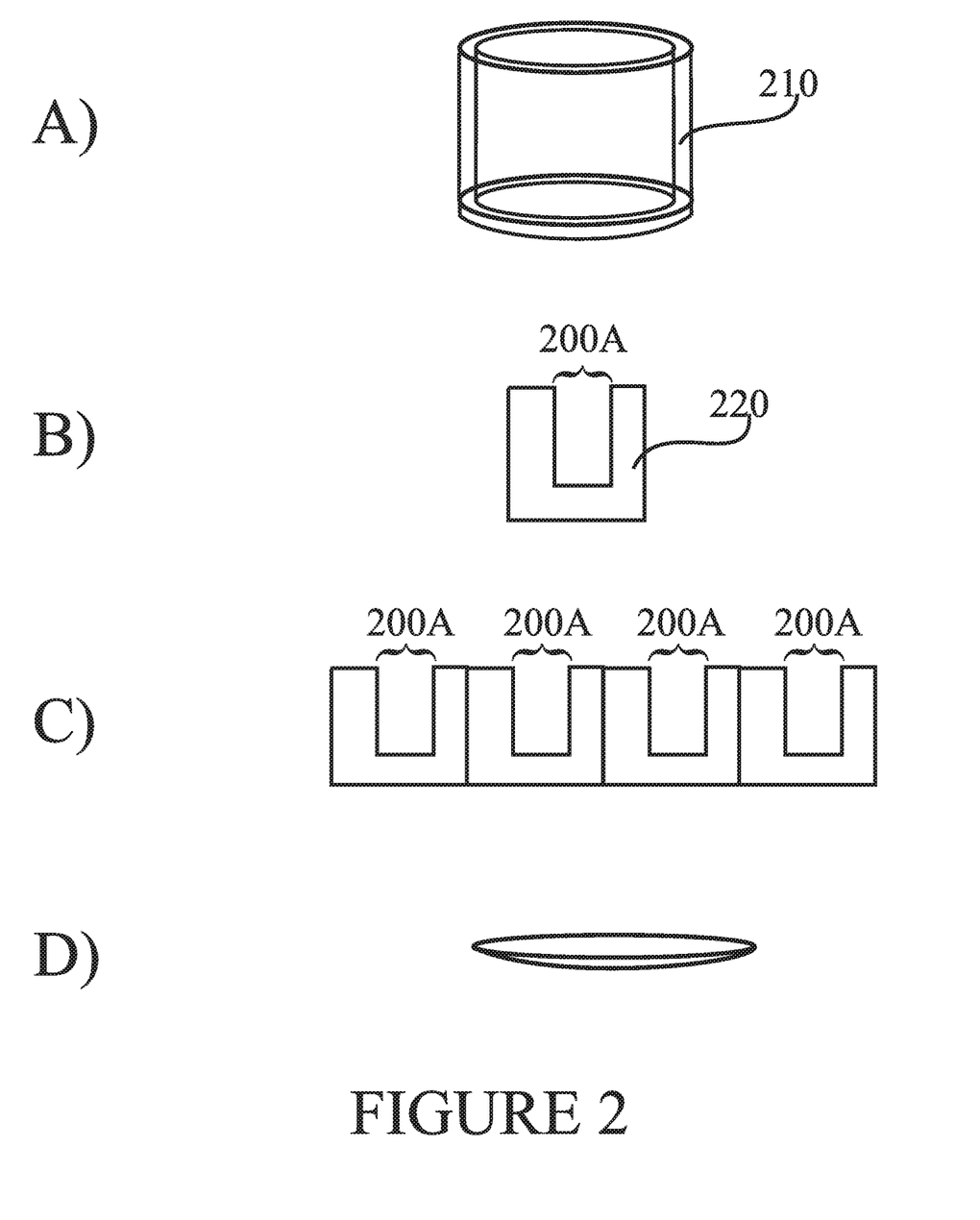
FIG. 2 illustrates examples of sample containers in accordance with some embodiments of the present invention.

FIG. 2 illustrates examples of sample containers in accordance with some embodiments of the present invention. In part A) of FIG. 2, a cylindrical sample container is illustrated. The top of the container may be flat, to facilitate scraping off excess sample, for example where the sample is in powder form. The sample container of part A) comprises an enclosing member in the form of a wall 210, a thickness of the wall being, for example, less than 5 mm. The enclosing member may have a diffuse transmittance of at least 90%. In some embodiments, the diffuse transmittance of the enclosing member is at least 80%, or at least 95%. The bottom of the cylindrical sample container may be made of the same material as the enclosing member or from another fluorocarbon plastic. The material may comprise fluorocarbon plastic, for example. A liquid or solid sample may be placed in the sample container of part A). Of course, instead of a cylindrical shape, the sample container may have, in other embodiments, a polygonal base and side walls acting as the enclosing member, for example. Overall in the sample containers illustrated, the enclosing member may be of a thickness of less than 5 millimetres. Enclosing member thicknesses of less than one millimetre may be used, resulting in even higher diffuse transmittance. An enclosing member thickness of even 50 or 100 micrometres is usable in practice. A height of a sample container may be less than 5 millimetres, which is sufficient to receive a thin sample. For example, the sample container of part A) may comprise a PTFE pan of 40 mm diameter, a wall height 2 mm, to hold a liquid sample and having a horizontal "handle" sticking out, say 10 mm×10 mm, for the user to easily hold it during filling and inserting/removing. In this example, the enclosing member thickness may be 200 micrometres.

Another example sample container comprises a sample holder for rapeseeds—horizontal pan of 40 mm diameter with a 0.5 mm high wall around to prevent the seeds from rolling off too easily; PTFE thickness of the pan 1 mm, so that dimples can be made in the bottom for individual seeds to settle in. Center-to-center distance of the dimples may be about 3 mm, so that the seeds don't touch each other, resulting in an optically thin overall sample; depth of the dimples may be 0.5 mm. A handle may further be provided for easy grapping.

A yet further example sample container comprises a sample holder for barley kernels, comprising a pan of 75 mm diameter with approximately 70 dimples, for example, to singulate barley kernels. PTFE thickness of the bottom 100 um. Dimples may be provided of about 2 mm depth, resulting in an overall height of 2.1 mm. The top surface may be flat, that is, no vertical walls. When loaded into the sphere, this PTFE container rests on the dimple bottoms. A separate handle is not necessary. In this case, the container itself is the enclosing member.

The cylindrical container may have a screwable or snap-on lid, made of the same material as the enclosing member, or from another fluorocarbon plastic, to enable analysing also gaseous samples, and/or to prevent evaporation from the sample into the integrating cavity, which might impair the long-term optical stability of the integrating cavity. When the sample is analysed inside the cavity, the cavity needs to be kept long-term stable and thus a lid provides a benefit in maintaining the optical characteristics of the integrating cavity. This differs from cases where the sample is outside the cavity and is merely exposed to light from the integrating cavity. In such applications, the long-term stability of the cavity itself is of less importance since aging effects of the cavity cancel themselves out in the spectroscopic reference ratio when measurement results are obtained. This cancelling-out does not occur when the sample is inside the cavity, since changes in the optical properties of the cavity result in effects that are mathematically roughly similar to pathlength changes in the case of conventional cuvette transmission spectroscopy. Consequently, for samples that are to be analysed inside the integrating cavity, a lid is useful to prevent outgassing from the sample from attaching itself to the interior walls of the cavity. Such outgassed contamination would interact with the diffuse light of the integrating cavity in future measurement of different samples, reducing the quality of such future measurements.

In some embodiments, a container comprises a plurality of hollow dimples, into which agricultural kernels may be placed. A lid may be permanently attached to cover the dimples, converting them into stably closed enclosure. The resulting container, which may be of PTFE or FEP, for example, may be used as a calibration standard. In this case, the enclosing member is present as a member forming the walls of the dimples.

Turning to part B) of FIG. 2, a two-dimensional slice of a sample container is illustrated. This sample container comprises a cylindrical enclosing member 220, and a hollow defined by the enclosing member, such that a diameter 200A of the hollow is large enough to allow manual loading of sample, for example liquid, into the container and to minimize capillary forces in the case of liquid samples. For example, diameter 200A may be at least 3 mm. As in case A), also this sample container may be made of fluorocarbon plastic. Analysing a relatively small quantity of sample is made more effective by placing the sample inside the integrating cavity, to obtain the benefits of the sphere multiplication factor. Of course, the sphere multiplication factor will occur also in integrating cavities that are not spheres in shape.

In part C) of FIG. 2, plural hollows as in part B) are made into the sample container, enabling several small quantities of sample liquid to be measured. The diameter 200A here may be the same as in part B). Using plural hollows enables an easy multiplication of the quantity of sample held by the sample container, while at the same time maintaining optical thinness. A larger quantity of sample produces a more readily measurable signal. The hollows of part B) and C) of FIG. 2 may be closable, using a suitable lid arrangement comprised in the sample container, to prevent outgassing contamination of the cavity, as described above.

Part D) of FIG. 2 illustrates a so called watch glass shape sample container. The sample container here comprises an enclosing member which forms the shape of the watch glass. The thickness and other properties of the enclosing member may be the same as those of enclosing member 210 of part A). The watch glass-shaped sample container may be useful, for example, with powder-form samples which do not outgas impurities into the integrating cavity.

Overall, sample containers used with liquid samples may have a pump mechanism to draw liquid into the sample container. A pump mechanism may comprise a suction bulb or hand pump, for example. A pump mechanism may facilitate drawing into the sample container a constant volume of the sample liquid.

Overall, sample containers may have an internal volume of 0.5 to 20 cubic centimetres, for example.

A sample container, for example a cylindrical container or the watch glass container, may have dimples or other indentations in its bottom, to facilitate individualization of sample elements, such as seeds. When sample elements are in these indentations, they may form an overall optically thin sample for analysis, as they do not conceal each other from the diffuse light of the integrating cavity. Such indentations may be made directly into the fluorocarbon plastic material. Overall a sample may comprise plural sample elements, and the sample elements may be separately suspended by the sample container, to enable measurement of the sample in an optically thin configuration.

In some embodiments, a sample container may comprise a shield part. Shield parts are not illustrated in FIG. 2 for the sake of clarity. A shield part may enable omitting, for example, baffle 114 from the structure of integrating cavity 110, as the shield part of the container would be oriented, during use, so that it is between input port 122 and the sample itself. The shield part may functionally act as a baffle, and/or it may comprise an optically scattering element. Either way, it prevents direct illumination of the sample by light from source 120. For example, in case the sample container is constructed of FEP, which is transparent, it may have a shield part of PTFE, which has a diffuse transmittance characteristic. For example, the diffuse transmittance of the shield part may be <20%. Where the shield has a diffuse transmittance, it may be referred to as a scattering member. Where the shield part acts as a baffle, it may be opaque and coated with the diffuse coating of the integrating cavity. The shield part may be 100% reflective. The shield part may comprise less than 20% of a surface area of an enclosing member of a sample container. This enables the sample to receive diffuse light to interact with. A shield part may be made of a same material as the rest of the enclosing member, but thicker, or, alternatively or in addition, the shield part may have a piece of metal to act as the shield.

Figure 3:
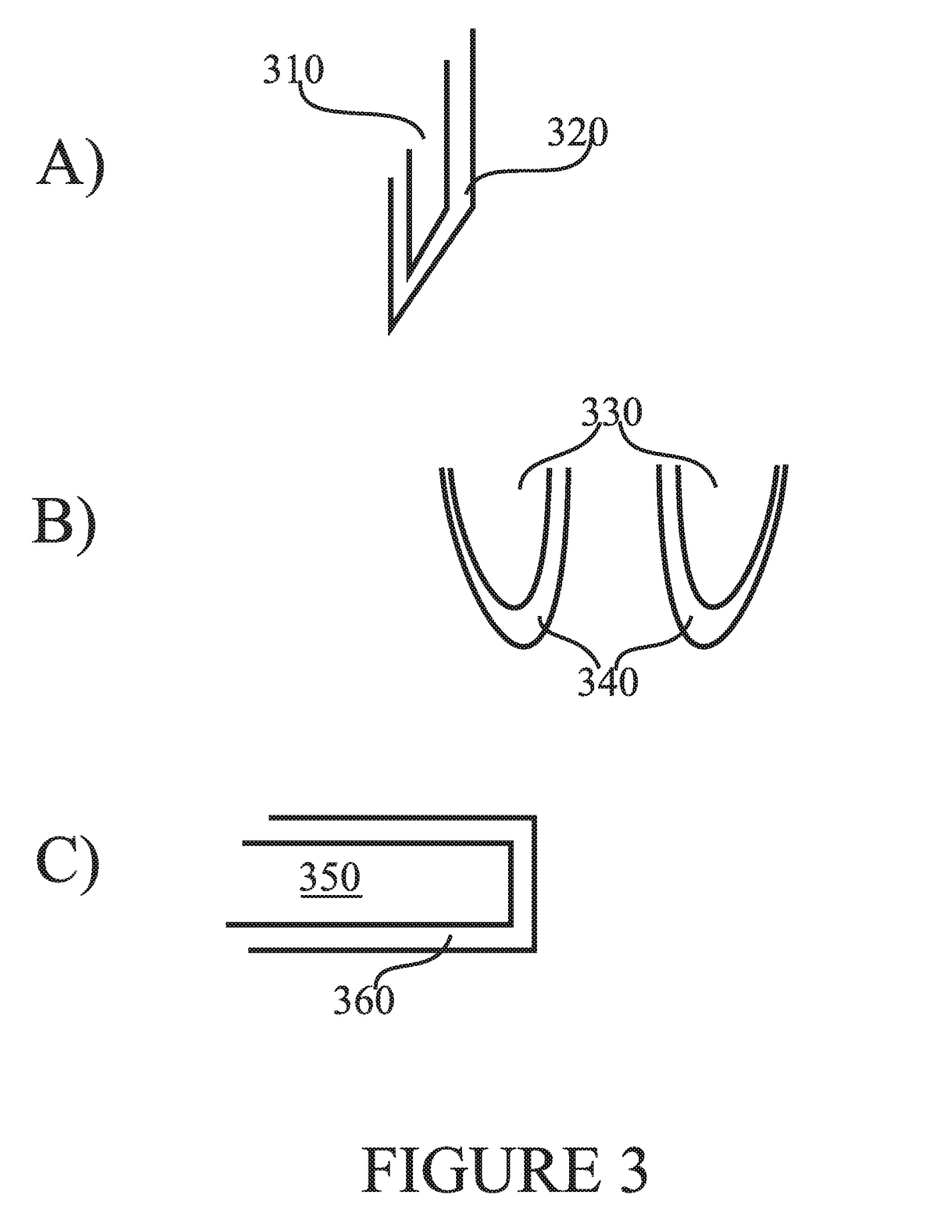
FIG. 3 illustrates examples of sample preparation tools in accordance with at least some embodiments of the present invention.

FIG. 3 illustrates examples of sample preparation tools in accordance with at least some embodiments of the present invention. Part A) of FIG. 3 illustrates a cutting edge, which comprises a body 310, coated with a fluorocarbon plastic layer 320. Part B) of FIG. 3 illustrates the tips of a tweezer, the tips comprising bodies 330, which are coated with a fluorocarbon plastic layer 340. In use, the tweezer tips may be pressed toward each other, to compress and/or lift sample elements. Finally, part C) of FIG. 3 illustrates a tip of a probe, which comprises a body 350, coated with a layer of fluorocarbon plastic 360. In each case, the body is optional in the sense that a suitably selected fluorocarbon plastic may be used to build the sample preparation tool completely. For example, PTFE is harder than FEP and more usable as a sample preparation tool material. A further example of a possible sample preparation tool is a shovel, coated with the fluorocarbon plastic material or built of the fluorocarbon plastic material, for moving powders into a sample container, for example.

Using sample preparation tools, such as those described above in connection with FIG. 3, provides the benefit that any parts or residues left in the sample from the sample preparation tools are translucent and thus do not affect the outcome of an optical analysis performed on the sample, for example when the sample is inside an integrating cavity. Thus a similar synergistic benefit is obtained as is obtained from using the translucent sample container, as laid out above. Preparation of the sample may comprise, for example slicing the sample using a cutting edge such as that illustrated in part A) of FIG. 3. Likewise, a sample element may be opened up using tweezers and/or probes, such as those illustrated in parts B) and C) of FIG. 3.

Figure 4:
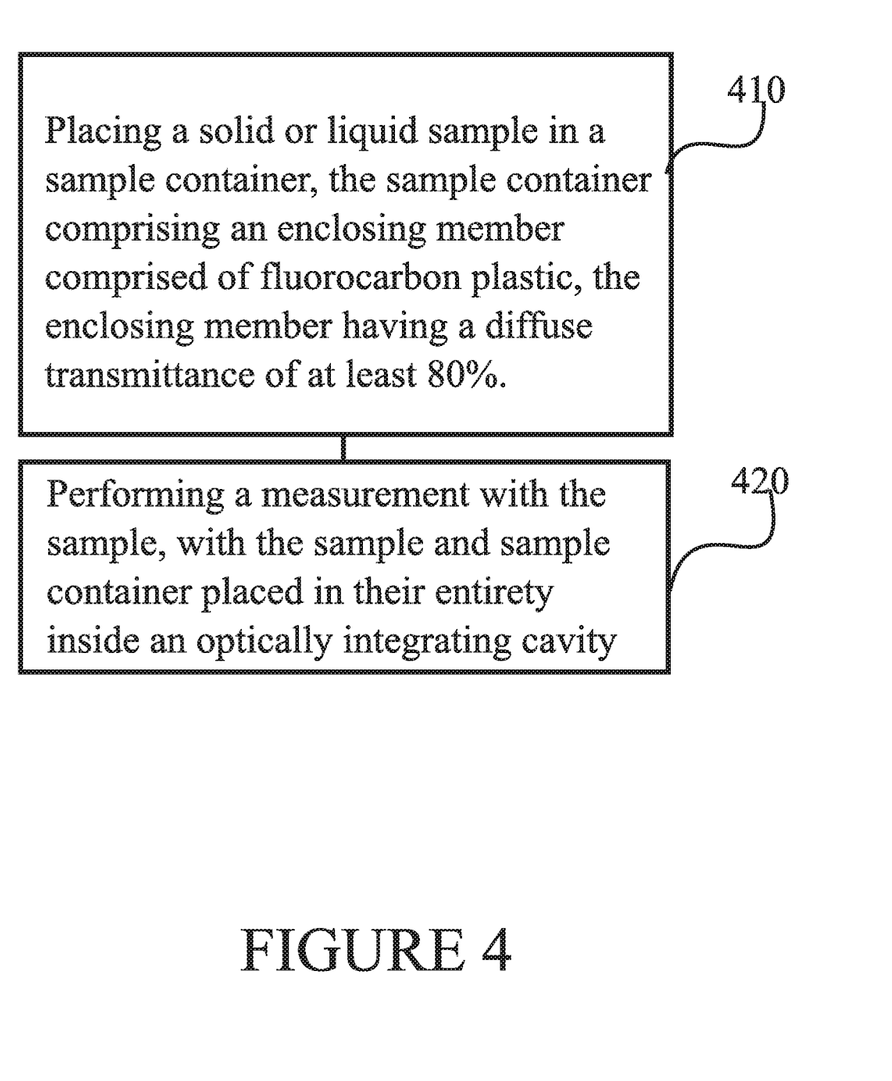
FIG. 4 is a flow graph of a method in accordance with at least some embodiments of the present invention.

FIG. 4 is a flow graph of a method in accordance with at least some embodiments of the present invention.

Phase 410 comprises placing a solid or liquid sample in a sample container, the sample container comprising an enclosing member comprised of fluorocarbon plastic, the enclosing member having a diffuse transmittance of at least 80%. The enclosing member may have a thickness of less than 5 mm. Phase 420 comprises performing a measurement with the sample, with the sample and the sample container placed in their entirety inside an optically integrating cavity.

The method may further comprise modifying the solid or liquid sample using a spectroscopic sample preparation tool which comprises at least one of: a cutting edge of fluorocarbon plastic, gripping surfaces of fluorocarbon plastic, and a probe end of fluorocarbon plastic.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in spectroscopic measurements.

ACRONYMS LIST

FEP fluorinated ethylene propylene
PFA perfluoroalkoxy alkane
PTFE polytetrafluoroethylene

REFERENCE SIGNS LIST

| | |
|---|---|
| 110 | Integrating cavity |
| 120 | Light source |
| 114, 118 | Baffles |
| 122 | Input port |
| 132 | Exit port |
| 130 | Spectral analyser |
| 111 | Translucent member |
| 112 | Sample container |
| 210 | Enclosing member |
| 200A | Diameter |
| 310, 330, 350 | Body |
| 320, 340, 360 | Fluorocarbon plastic coating |
| 410-420 | Phases of the method of FIG. 4 |

The invention claimed is:

1. A sample container for use such that the sample container is in its entirety inside an optically integrating cavity, comprising:
   an enclosing member comprised of fluorocarbon plastic;
   the enclosing member having a diffuse transmittance of at least 80%;
   the enclosing member comprising a shield part which is a baffle or a scattering element having diffuse transmittance of less than 20%, and
   the sample container being adapted to contain a solid or liquid sample, the sample container not being built or installed as part of a wall of the integrating cavity, and wherein the sample container is so adapted as to enable, during a measurement, placement of the shield part between the solid or liquid sample and a light input port of the integrating cavity, when the sample container is inside the integrating cavity.

2. The sample container according to claim 1, wherein the shape of said sample container is adapted to realize an optically thin sample measurement.

3. The sample container according to claim 1, wherein the shield part comprises less than 20% of a surface area of the sample container.

4. The sample container according to claim 1, wherein the sample container comprises a lid, attachable to the sample container, to close the sample container.

5. The sample container according to claim 1, wherein the enclosing member defines an inner dimension of the sample container, the inner dimension being more than 3 millimetres.

6. The sample container according to claim 5, further comprising plural tubes of inner dimension more than 3 millimetres.

7. The sample container according to claim 1, wherein the enclosing member is comprised of fluorocarbon plastic by at least 98% of its volume.

8. The sample container according to claim 1, wherein the sample container comprises at least one of the following: a tube, a shovel and a flat pan.

9. The sample container according to claim 1, further comprising having an inner volume in the range of 0.5 to 20 cubic centimetres.

10. The sample container according to claim 1, further comprising having dimples or pits for containing, separately, plural sample elements of the sample.

11. The sample container according to claim 1, wherein the sample container has a circular concave shape known as a watch glass.

12. The sample container according to claim 1, wherein the sample container comprises a fluorocarbon plastic lid permanently attached to cover plural dimples built of fluorocarbon plastic, forming stably closed enclosures, wherein each of the stably closed enclosures comprises a sample inside the stably closed enclosure.

13. A method, comprising:
    placing a solid or liquid sample in a sample container, the sample container comprising an enclosing member comprised of fluorocarbon plastic, the enclosing member having a diffuse transmittance of at least 80%, the enclosing member comprising a shield part which is a baffle or a scattering element having diffuse transmittance of less than 20%, and
    performing a measurement with the sample, with the sample and the sample container placed in their entirety inside an optically integrating cavity, the sample container not being built or installed as part of a wall of the integrating cavity, wherein during the measurement the shield part is oriented between the solid or liquid sample and a light input port of the integrating cavity, the sample container not being built or installed as part of a wall of the integrating cavity.

14. The method according to claim 13, further comprising modifying the solid or liquid sample using a spectroscopic sample preparation tool which comprises at least one of: a cutting edge of fluorocarbon plastic, gripping surfaces of fluorocarbon plastic, and a probe end of fluorocarbon plastic.

15. The method according to claim 13, wherein the enclosing member is of polytetrafluoroethylene, PTFE, the measurement is a spectroscopic measurement using near infrared between 700 and 2500 nanometres, and where a thickness of the enclosing member is less than one millimeter.

* * * * *